United States Patent [19]

Pfeffer et al.

[11] Patent Number: 4,966,639
[45] Date of Patent: Oct. 30, 1990

[54] APPARATUS FOR MANUFACTURE OF REINFORCED FILE FOLDERS

[75] Inventors: George Pfeffer, Minnetonka, Minn.; Donald T. Barber, Toronto, Canada

[73] Assignee: Wright Line of Canada Ltd., Willowdale, Canada

[21] Appl. No.: 16,082

[22] Filed: Feb. 18, 1987

[51] Int. Cl.$^5$ .............................. B31F 5/00; B31F 5/08
[52] U.S. Cl. ...................................... 156/359; 156/64; 156/320; 156/322; 156/324; 156/554; 156/555; 156/459; 156/461
[58] Field of Search ................. 156/64, 357, 320, 321, 156/324, 322, 554, 555, 200, 201, 202, 204, 216, 459, 461; 40/355; 219/469, 471; 428/192, 121, 347

[56] References Cited

U.S. PATENT DOCUMENTS

| | | | |
|---|---|---|---|
| 1,926,245 | 9/1933 | Schmitt | 156/554 X |
| 2,171,259 | 8/1939 | Scott | 156/320 X |
| 2,224,370 | 12/1940 | Wescott | 156/320 X |
| 2,749,966 | 6/1956 | Roetger | 156/201 |
| 3,038,982 | 6/1962 | Ludlow | 156/202 X |
| 3,183,137 | 5/1965 | Harmon et al. | 156/322 X |
| 3,239,402 | 3/1966 | Ecklund | 156/200 |
| 3,388,019 | 6/1968 | Thigpen | 156/321 X |
| 3,412,229 | 11/1968 | Seagrave, Jr. | 219/471 X |
| 4,005,302 | 1/1977 | Graf et al. | 219/469 X |
| 4,320,284 | 3/1982 | Dannatt | 219/469 |
| 4,560,860 | 12/1985 | Fauser | 219/472 X |

FOREIGN PATENT DOCUMENTS 1197155 11/1985 Canada .

Primary Examiner—Michael W. Ball
Assistant Examiner—Jeff H. Aftergut

[57] ABSTRACT

A reinforced film of a laminate construction is thermally adhered to an edge of a web of paper stock in preparation for forming a reinforced edge of a file folder. The film has two layers, each having different characteristics, where the bottom layer becomes thermally active as an adhesive at a temperature substantially lower than the activation temperature of the other layer. The film is applied by directly heating the top layer to a temperature which in turn heats the bottom layer to a temperature where it acts as an adhesive. The layers can include a printed surface intermediate the film which is visible through the top layer or the layers can include an appropriate pigment to color code the edge of the folder. The apparatus can be added to existing file folder machines to apply the film without the need for sophisticated controls to tie the apparatus to the operation of the file folder machine.

4 Claims, 5 Drawing Sheets

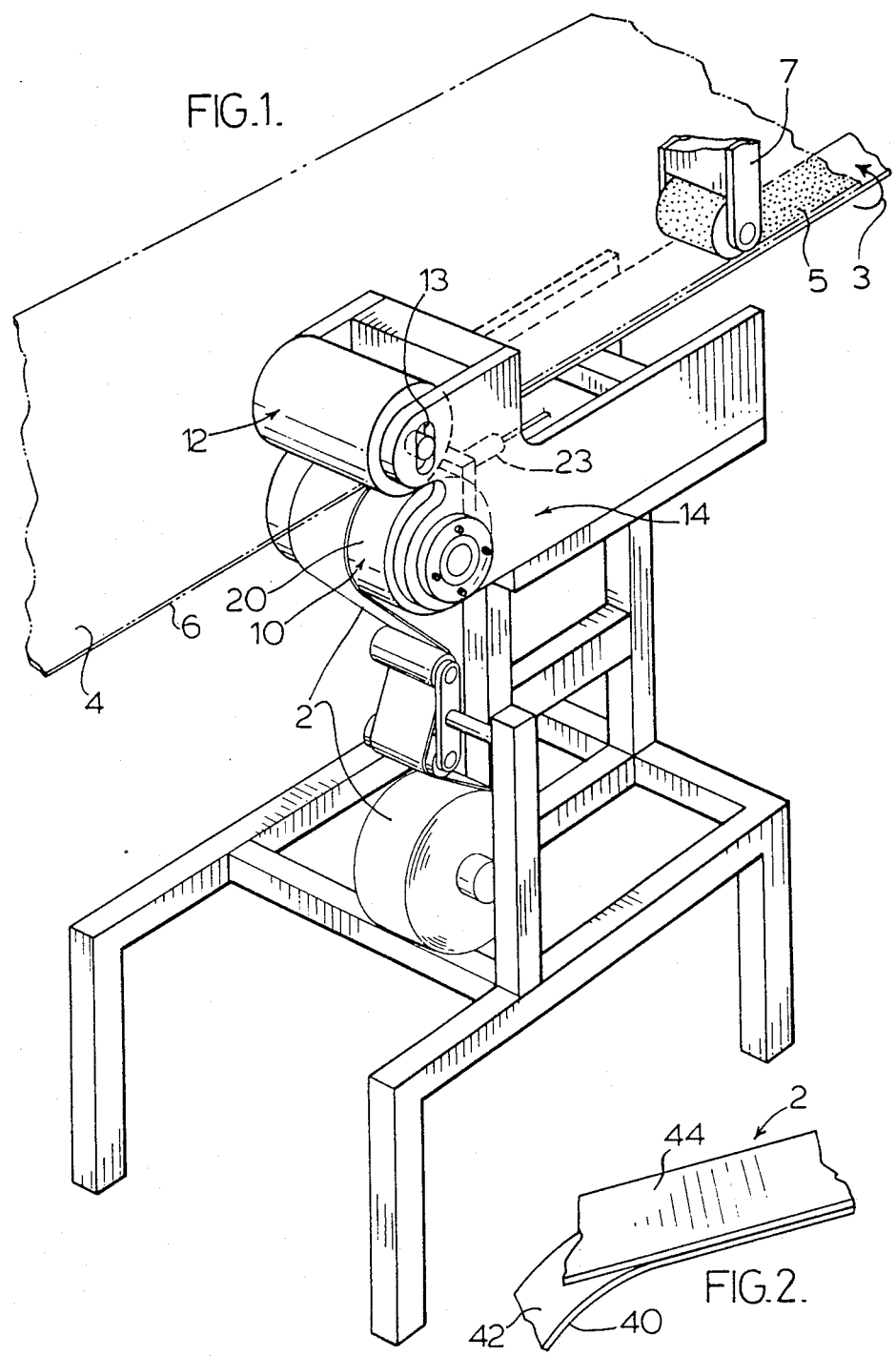

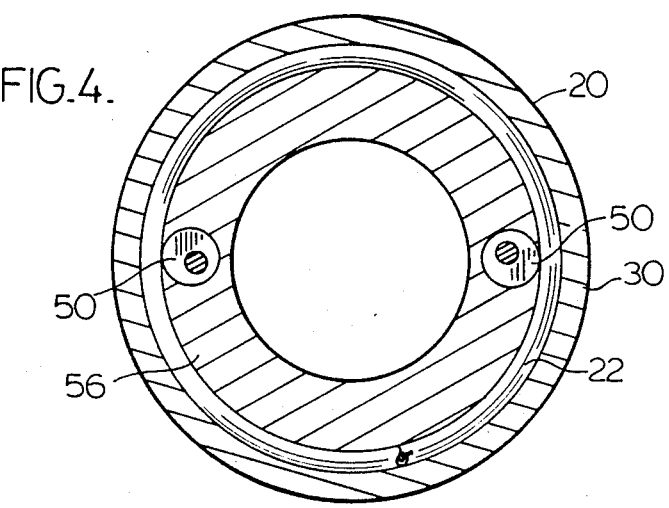
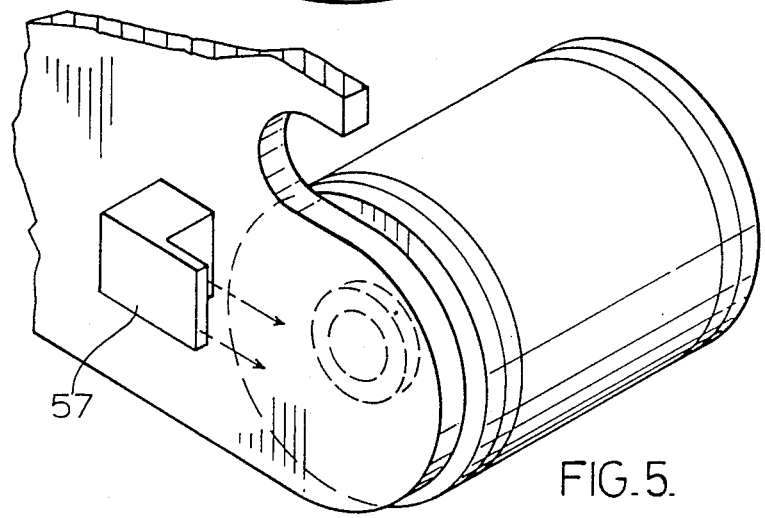

APPARATUS FOR MANUFACTURE OF REINFORCED FILE FOLDERS

BACKGROUND OF THE INVENTION

The present invention relates to reinforced file folders and particularly reinforced file folders having a plastic film applied to one edge thereof.

In our co-pending U.S. application Ser. No. 793,173 filed Oct. 28, 1985, and Canadian Patent No. 1,197,155 which issued Nov. 26, 1985, a reinforced file folder is disclosed which has a plastic reinforcing film adhesively secured to one edge of file folder stock used in the manufacture of file folders. As noted in the earlier applications and patent, it is desirable to apply a plastic film reinforcing strip which has an appropriate color associated therewith for coloring the edge of the folder. Such an arrangement allows economies of scale with respect to the purchase of paper stock, while providing a convenient, efficient method of producing a color coded folder.

SUMMARY OF THE INVENTION

According to the present invention, a laminated plastic reinforcing film is applied to the edge of a file folder and adhesively secured by a thermally activated layer of the film. The film has an outer layer of polyester, preferably cross linked, and a lower layer of polypropylene film. The different layers have different thermal activation temperatures with respect to the adhesive quality of the layers, whereby heat may be applied through the polyester film, which remains inactive as the polypropylene layer is brought to a thermally active temperature. Once the polypropylene film has been thermally activated, the film may be pressed into contact with a paper substrate with the polypropylene layer adhesively securing the polyester film to the exterior of the paper substrate along an edge thereof. In effect, the polyester film acts as a heat buffer and provides the necessary properties with respect to reinforcing the edge of the folder, while the polypropylene layer provides the means for thermally adhering the polyester film to the paper substrate. Care must be exercised in heating of the film to ensure significant structural changes of the polyester film due to exposure to excess temperatures do not occur. High strength polyester film is partial due to cross linking, and cross linking is temperature sensitive at temperatures somewhat higher than the temperature at which the polypropylene film becomes thermally active.

The method, according to the present invention, is for use in the manufacture of file folders where the paper stock is advanced through a number of stations or operations terminating in the cutting of the folder from the paper stock and folding of the folders. The improvement comprises heating a plastic laminated reinforcing film having a first layer of polyester and a second layer of polypropylene, with the heating being accomplished by bringing the polyester film into direct contact with a heated roll and raising the temperature of the film to a temperature sufficient to thermally activate the polypropylene film as an adhesive. Care is exercised to ensure the polyester film itself is not raised to a temperature where it would become active as an adhesive or to a temperature which would cause significant structural changes. Therefore, the polyester film acts as a buffer between the heat source and the polypropylene layer. Once the temperature of the film has been raised to within the desired temperature range, it is pressed into contact with the folder stock along a flat edge of the folder, with the polypropylene acting as an adhesive securing the polyester film to the folder stock. The film is applied to one side of the paper stock and the paper stock is folded over intermediate the width of the film, with the film exposed to the exterior. Adhesive is appropriately applied for securing the folded paper stock and film in the folded condition. Such a method results in a file folder having a double thickness of paper stock with at least a portion of the resulting folder having film wrapped about the edge thereof. Subsequent process steps may remove a portion of the reinforced edge to thereby define a label receiving extension along an entire edge of the folder.

BRIEF DESCRIPTION OF THE DRAWINGS

Preferred embodiments of the invention are shown in the drawings wherein;

FIG. 1 is a partial perspective view showing the application of the film to paper folder stock as it is being advanced;

FIG. 2 is a partial perspective view showing the plastic laminate film;

FIG. 4 is a sectional view through the heating roll;

FIG. 5 is a partial perspective view of the heating roll and the electrical connection thereof;

DETAILED DESCRIPTION OF THE PREFERRED EMBODIMENTS

Figure 3:
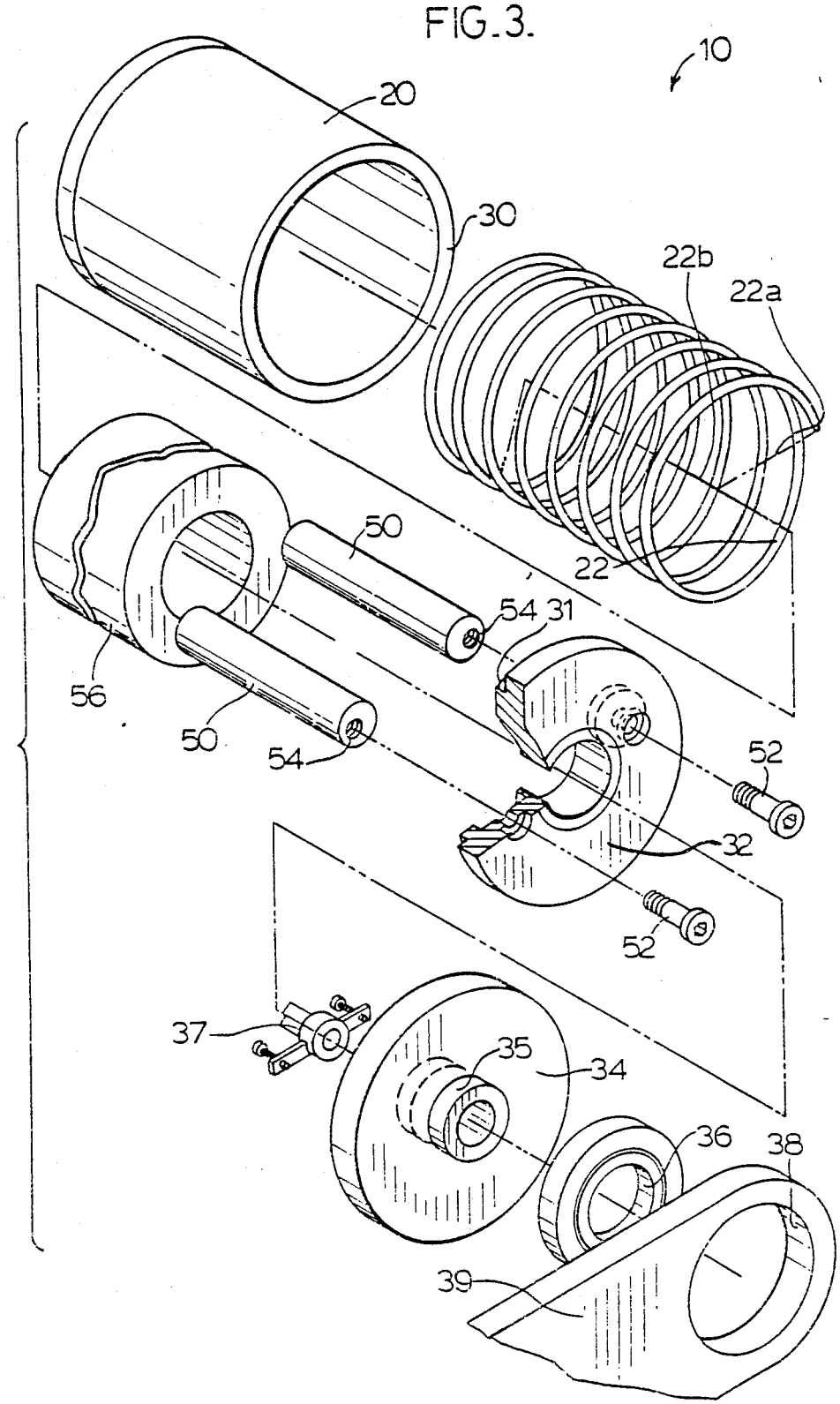
FIG. 3 is an exploded perspective view of the heating roll used for activating the plastic laminate film.

The apparatus generally shown in FIG. 1 applies the plastic reinforcing film 2 to the folder paper stock 4 as it is advanced through a number of operations necessary for the manufacture of a file folder. The reinforcing film 2 is applied almost immediately after the paper stock has been withdrawn from a supply roll. The film is applied adjacent the edge 6 of the file folder paper stock 4 and the film and folder stock will be folded as indicated by arrow 3 intermediate the width of the film to thereby define an edge having a double thickness of paper stock coated to the exterior with the reinforcing film. The film is exterior to the folded paper stock, and the opposed paper stock portions are adhesively secured preferably by a cold setting adhesive 5 applied at station 7. The reinforcing film 2 is advanced from the supply roll and passes over the heated roll or drum 10 and pressed into contact with the file folder paper stock 4 as pressure opposed gravity roller 12 urges the paper stock into contact with the heated reinforcing film. The heated roll 10 is suitably supported by the support arrangement 14 which also serves to locate the gravity pressure roll 12 in slots 13. The exterior cylinder portion 20 of the heated roll 10 has a non stick coating and includes interior electrical heating elements 22 for maintaining the surface roll 10 at a temperature sufficient to thermally activate the polypropylene film in the desired manner.

FIG. 2 shows a partial perspective view of the reinforcing film 2 suitably split to illustrate the polypropylene layer 40 and the polyester layer 44. In the case of achieving a colored film by printing, it is preferred that the polypropylene layer be of a white color and the polyester layer being transparent. Surface 42 of the polypropylene layer 40 or the opposed surface of the polyester layer 44 is suitably printed with a desired color visible through the transparent polyester layer. It has been found that if the polypropylene is white in color, superior printing (i.e. the consistency and the reproducibility of the color) to produce the desired color is obtained.

The polyester layer 44 is brought into direct contact with the heated roll 10 and acts as a non-reactive intermediary or buffer between the teflon coating 20 and the polypropylene layer 40. The polypropylene layer 42 generally becomes active as an adhesive, i.e. it becomes soft and tacky, at about 280° C. F., whereas the polyester film does not become adhesively activated until a temperature of about 350° F. Permanent structural changes in the polyester film should be avoided and the upper temperature limit may be somewhat less than 350° F. As long as the drum is maintained below about the activation temperature of the polyester layer, the polyester acts as an effective buffer through which heat can be transferred. In this way, the surface 20 of the drum does not become contaminated with adhesive and the polypropylene layer may be brought into contact with the surface of the paper substrate 4 and pressed thereagainst due to the gravity pressure roller 12 applying a compressing force, urging the paper stock into intimate contact with the polypropylene layer.

The electrical heating elements 22 of heated roll 10 are controlled by means of thermocouple 23 which is in contact with the exterior surface of the roll 10. The elements 22 are activated whenever the roll temperature drops below a given temperature where the polypropylene is tacky or activated (normally about 280° F. or slightly higher). This lower temperature can be considered a threshold temperature and the elements remain on until the roll temperature reaches an upper limit temperature which will not cause damage to the polyester film. This temperature range defines the operating temperature of roll 10 and can be adjusted as necessary. The film 2 remains in contact with the roll 10 during application to the paper substrate 4 and intimate contact is ensured by the gravity roll 12 which is about 35 pounds in weight. Unfortunately, heat is being removed by the paper substrate as it is advanced and the amount of heat removed is a function of the rate of travel of the paper substrate. Surprisingly, by providing powerful heat elements 22, preferably in excess of 5,000 watts, the temperature of the film can be maintained within the temperature band without providing a speed adjustment. Substrate speeds are typically in the range of 100 feet per minute to about 350 feet per minute.

Details of the heated roll 10 are shown in FIG. 3. The heated roll 10 includes a tubular sleeve member 30 in which the coil electrical heating elements 22 are inserted. Each end of the sleeve 30 includes two cap members, a steel cap member 32 and a teflon cap member 34 to effectively thermally isolate the roll 10 from the support structure 14. The steel cap member 32 includes a collar region 31 for engaging the inner surface of the sleeve 30, and the opposed steel caps are held together by tie bars 50. Each tie bar includes an eccentrically positioned threaded port 54 at each end which cooperate with bolt members 52. These tie bars may be rotated somewhat about the axis of bolt members 52 to cause the coil electrical heating elements 22 to come into pressure contact with the interior of sleeve 30. Interior to the tie bars 50 and interior to the electrical heating elements 22 is an insulation sleeve or layer 56 which serves to maintain heat to the exterior of the roll 10. Secured at one end of the heat roll 10 to the adjacent teflon cap 34 is a rotary electrical switch 37 which electrically connects leads 22a and 22b of the heating element 22 to a power source located exterior to the drum. Switch 37 is a mercury slip ring made by Merco-Tac of California. Teflon caps 34 include a bearing cooperating shoulder 35 received in the interior of bearing 36, with bearing 36 received within the aperture 38 of support arm 39. As can be seen, the axis of the heating roll 10 is open and blower, indicated as 57, can be placed over the aperture in support arm 38 to cause an airflow to pass through the center and along the longitudinal axis of the heated roll 10. This air flow passes directly over the mercury slip ring 37 and will maintain the temperature of the slip ring below about 140° F. This arrangement ensures that the interior of the heated roll 10 and bearing mounts are relatively cool, while the exterior of the sleeve 30 is maintained at a significantly higher temperature to cause the desired change in the polypropylene film layer.

Figure 6:
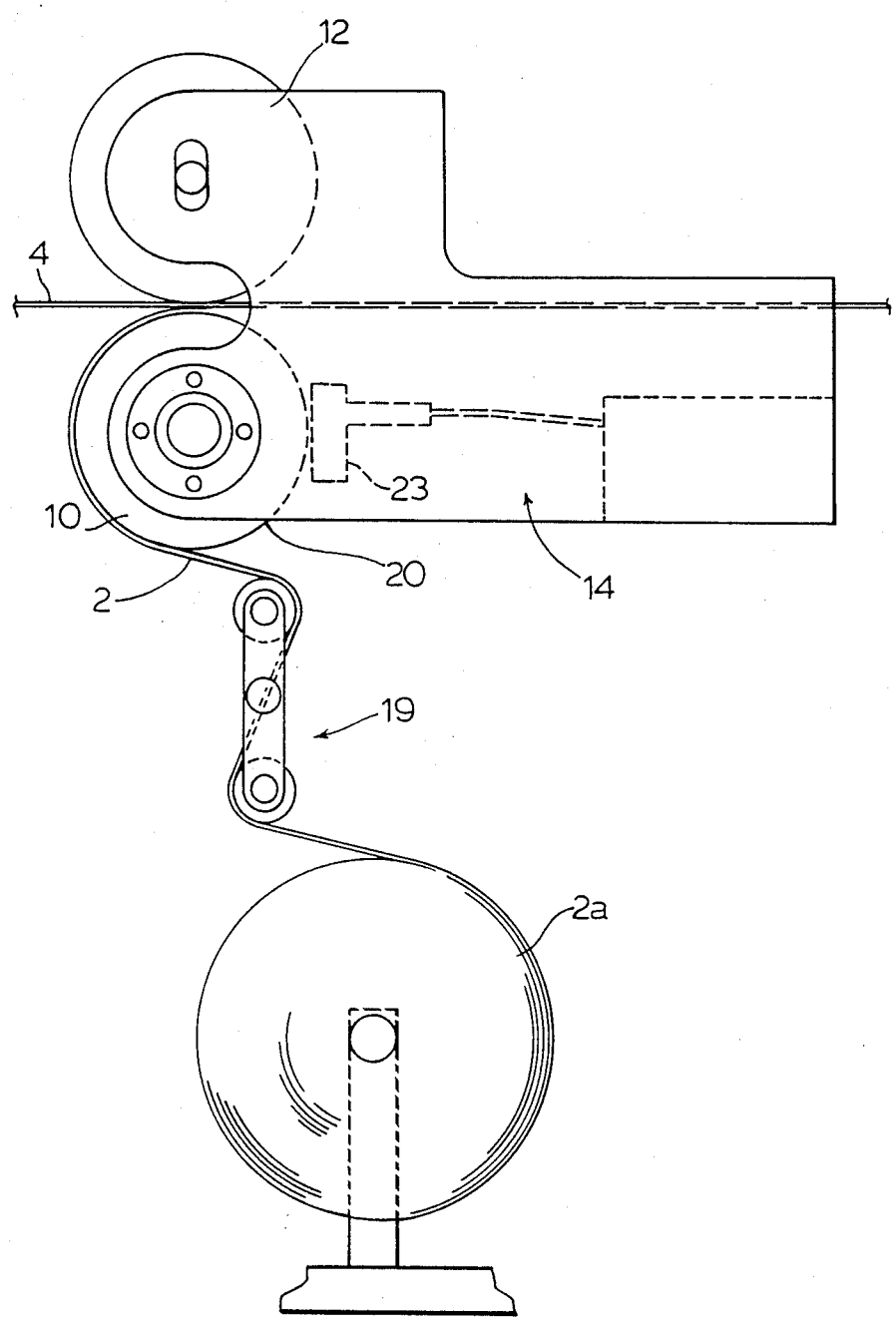
FIG. 6 is a side elevation of the laminator.

The elevational view of FIG. 6 shows the relationship of the gravity roll 12, the surface 20 of the heated roll 10, the positioned of the thermocouple 23 at the rear of the heated roll 10, and the guide arrangement 19 used to direct the reinforcing film about the heated roll 10. The guide arrangement 19 also serves to maintain a certain drag on the film and thus tension the film about the heated roll 10. The roll supply of film, generally shown as 2a, the heated roll 10 and the gravity roll 12 all freely rotate, and the advance of the reinforcing film 2 from the supply roll 2a is caused due to the adhesion of the film to the paper substrate 4 which is being advanced along a predetermined path. Therefore, the laminator relies on the movement of the paper substrate to cause the appropriate advance of the film and no drive arrangements are required for either the gravity roll 12, the heated roll 10 or the supply roll 2a. This arrangement also serves to tension the film and ensure intimate contact with the heated roll 10.

File folder machines are normally designed to operate at a paper substrate speed of anywhere from 100 to 350 feet per minute, depending upon the folder being produced and possibly the printing required on the same. Side tab folders generally run at a speed of less than 300 feet per minute. It has been found that the laminator as disclosed in the present application operates satisfactorily within the above speed range and does not require a speed regulation of the heating elements 22. The simple control of the heating elements 22, by means of a thermocouple for monitoring the temperature of the surface of the heated roll, operates efficiently and does not unduly effect the normal operation of the file folder machine. The temperature of the heated roll 10 can cause damage to film that is left thereon if the file folder machine should stop for an extended period of time, however, this portion of the substrate paper may merely be removed when the operation of the apparatus continues. Rethreading of the film will not be required as the paper substrate downstream of the laminator will continue to draw new film over the heated roll and thus resume the application of the film to the paper substrate.

Figure 7:
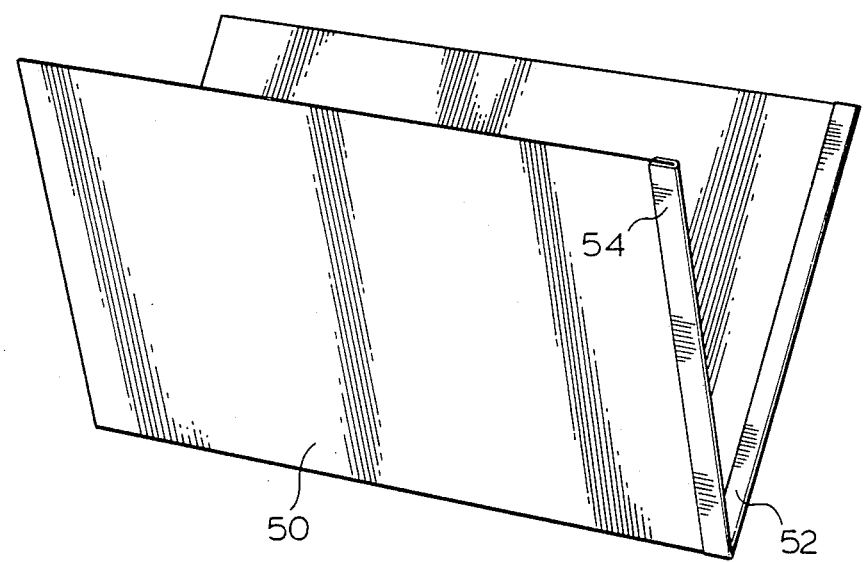
FIG. 7 is a perspective view of a side tab folder to which the reinforcing film has been applied.

The side tab or lateral file folder 50 as shown in FIG. 7, has the film applied to an extending edge 52 thereof intended to receive indentifying labels. Edge 54 has been cut to expose most of edge 52 when the file folder is folded, but still includes opposed exterior film layers. The film is applied as a continuous length to the entire edge of the folder and then a portion of the folder is removed to define the label receiving extension. The reinforcing film serves to distribute forces to a larger portion of the file folder and thereby increase the durability of the file folder. The particular polypropylene/polyester combination plastic film allows a simple method for securing the film to the paper stock and when printed in the manner set forth, provides excellent quality control with respect to color consistency. This allows the adoption of certain color specifications which can be reproduced such that additions to file folder systems are consistent, even if the paper stock has changed. The quality control possible in the printing of the film rather than the printing of the paper stock results in a superior product and reduces the cost in that the film may be printed in large sheet format and thereafter cut into the rolls of significantly reduced width. Colouring of the edge of a file folder also produces economies of scale with respect to the paper stock portion as all paper stock may be of the same color and grade.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In an apparatus for making side tab file folders from paper stock as the paper stock is withdrawn from a paper web stock supply and advanced along a predetermined path, said apparatus including means for folding over an edge of the web and secure the same as the web stock is advanced to produce an edge having a double thickness, the improvement comprising a station to apply a plastic reinforcing film to an edge region of the paper web stock upstream of the means for folding and securing, said station including a roll supply of plastic laminate film having a first layer high tensile strength and a second layer which serves as a thermally activated adhesive, a heated drum over which said film is at least partially trained with said first layer in direct contact with the surface of said heated drum which raises the temperature of said film to thermally activate said second layer while maintaining said first layer below its thermally active adhesion temperature, said heated drum being positioned to apply said heated film to said paper stock with said second layer being brought into direct contact with said paper web stock in alignment with an edge thereof and being pressed against the paper web stock by a pressure roller cooperating with said heated drum and located to the opposite side of said paper stock, and wherein said heated drum includes control means which senses the exterior temperature of said drum and causes an electrical resistance heating element means with said drum to be activated at a lower threshold temperature and deactivated at an upper limit temperature and wherein said heating element means is of a power greatly exceeding the energy necessary to raise the temperature of the film in isolation of the paper substrate; and wherein said drum is hollow and includes means for urging said electrical heating element means into pressure contact with the interior of said drum about the cylindrical surface thereof, said drum includes insulation means interior to said electrical heating elements means to provide an interior lining of said cylindrical surface and element means while defining a longitudinally extending hollow passage bound by said insulation.

2. In an apparatus as claimed in claim 1, including blower means associated with one end of said drum and aligned said hollow passage, said blower means causing air to flow through the interior of said drum and exhausted at the end of said drum opposite said blower to remove heat interior to said insulation means.

3. In an apparatus as claimed in claim 2, including a mercury switch secured at one end of said drum to be in the air flow through said drum, said mercury switch providing a rotary electrical connection between said drum and a power supply.

4. In an apparatus as claimed in claim 1, wherein said means for urging said electrical heating element means into contact with said drum includes at least two eccentrically mounted tie bars rotatable generally about the longitudinal axis thereof to bias said element means into contact with said drum.

* * * * *